(12) United States Patent
Walter et al.

(10) Patent No.: US 10,532,931 B2
(45) Date of Patent: Jan. 14, 2020

(54) METHOD FOR CARBONIZING LIGNOCELLUOSIC MATERIAL AS A POWDER

(71) Applicant: Stora Enso OYJ, Helsinki (FI)

(72) Inventors: Stephan Walter, Enskede (SE); Niklas Garoff, Hägersten (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/532,660

(22) PCT Filed: Dec. 11, 2015

(86) PCT No.: PCT/IB2015/059531
§ 371 (c)(1),
(2) Date: Jun. 2, 2017

(87) PCT Pub. No.: WO2016/092511
PCT Pub. Date: Jun. 16, 2016

(65) Prior Publication Data
US 2017/0313585 A1 Nov. 2, 2017

Related U.S. Application Data

(60) Provisional application No. 62/090,538, filed on Dec. 11, 2014.

(51) Int. Cl.
*C01B 32/05* (2017.01)
*C08H 7/00* (2011.01)
(Continued)

(52) U.S. Cl.
CPC .............. *C01B 32/05* (2017.08); *C08H 6/00* (2013.01); *C08H 8/00* (2013.01); *C09C 1/48* (2013.01);
(Continued)

(58) Field of Classification Search
CPC .. C01B 32/05; C01P 2006/12; C01P 2004/12; C01P 2004/50; C01P 2004/61; C01P 2004/62; C01P 2004/64
See application file for complete search history.

(56) References Cited

U.S. PATENT DOCUMENTS 4,101,412 A * 7/1978 Choi ...................... C10B 49/12
201/12
5,843,393 A * 12/1998 Denton, III ............... D01F 9/12
423/447.4
(Continued)

FOREIGN PATENT DOCUMENTS

CN 102502625 6/2012
CN 102502625 A 6/2012
(Continued)

OTHER PUBLICATIONS

Lou, Rui, and Shu-bin Wu. "Products properties from fast pyrolysis of enzymatic/mild acidolysis lignin." Applied Energy 88.1 (2011): 316-322.*
(Continued)

*Primary Examiner* — Richard M Rump
(74) *Attorney, Agent, or Firm* — Greer, Burns & Crain Ltd.

(57) ABSTRACT

The present invention provides a novel cost efficient method for carbonizing lignocellulosic material to carbonized particles or agglomerates, preferably carbon powder. Also uses of said particles or agglomerates are disclosed.

24 Claims, 9 Drawing Sheets

(51) Int. Cl.
*C08H 8/00* (2010.01)
*C09C 1/48* (2006.01)

(52) U.S. Cl.
CPC ...... *C01P 2004/50* (2013.01); *C01P 2004/60* (2013.01); *C01P 2004/61* (2013.01); *C01P 2004/62* (2013.01); *C01P 2004/64* (2013.01); *C01P 2006/12* (2013.01); *Y02E 50/14* (2013.01); *Y02T 50/678* (2013.01)

(56) References Cited

U.S. PATENT DOCUMENTS

2010/0304141 A1* 12/2010 Kamegawa ............. C01B 31/02
                                                        428/402
2015/0196893 A1   7/2015 Mennell et al.

FOREIGN PATENT DOCUMENTS

| CN | 107001050 | | 8/2017 | |
|---|---|---|---|---|
| JP | 2009242179 A | | 10/2009 | |
| JP | 4487017 B1 | * | 6/2010 | ............ B82Y 30/00 |
| JP | 2011063644 | | 3/2011 | |
| WO | 9003458 A1 | | 4/1990 | |
| WO | 2009072393 A1 | | 6/2009 | |
| WO | 2011013161 A1 | | 2/2011 | |
| WO | 2015097641 | | 7/2015 | |
| WO | 2015109206 | | 7/2015 | |

OTHER PUBLICATIONS

Lai, ZhiYi, et al. "Thermogravimetric analysis of the thermal decomposition of MSW in N2, CO2 and CO2/N2 atmospheres." Fuel processing technology 102 (2012): 18-23.*
Fernandez-Akarregi, A. Ruth, et al. "Design and operation of a conical spouted bed reactor pilot plant (25 kg/h) for biomass fast pyrolysis." Fuel processing technology 112 (2013): 48-56.*
International Search Report for PCT/IB2015/059531, dated Mar. 10, 2016.
Snowdon, M. R. et al "A study of carbonized lignin as an alternative to carbon black", ACS Sustainable Chemical Engineering, Apr. 10, 2014, pp. 1257-1263, vol. 2.
Suhas, P. J. M. C. et al "Lignin—from natural adsobent to activated carbon: A review", Bioresource Technology, 2007, pp. 2301-2312, vol. 98.
Kijima M. et al "Thermal conversion of alkaline lignin and its structured derivatives to porous carbonized materials", Bioresource Technology, 2011, pp. 6279-6285, vol. 102.
National Intellectual Property Administration, PRC, First Office Action, Chinese Application 201580067537.2, dated Oct. 9, 2018.
European Patent Office, Supplemental European Search Report, Application No. 15868340.9, dated Aug. 9, 2018.

* cited by examiner

METHOD FOR CARBONIZING LIGNOCELLUOSIC MATERIAL AS A POWDER

This application is a U.S. National Stage under 35 U.S.C. § 371 of International Application No. PCT/IB2015/059531 filed Dec. 11, 2015, which claims priority U.S. Patent Application No. 62/090,538 filed Dec. 11, 2014.

FIELD OF INVENTION

The present invention provides a novel cost efficient method for carbonizing lignocellulosic material to carbon powder. It has been discovered that, surprisingly, the efficiency of carbonization was improved when carbonization was carried out on powdery substrates in such a way that the substrates maintained their powdery state during the process. The disclosure describes the materials and the method of manufacturing the carbon powders. Application areas of carbonized carbon powders include activated carbons for e.g. water treatment, solvent recovery in gaseous states to air purification or as substitute for carbon black for rubber reinforcement, as a pigment, or as substitute for conductive carbon black for rendering polymers electrically dissipative/conductive.

BACKGROUND

The two largest application areas for carbon powders are rubber reinforcement using carbon blacks and filtration using activated carbon. Specialized carbon blacks are used as pigments or additives to render polymers electrically dissipative/conductive.

The raw materials for these carbon powders are rich in carbon and mainly fossil-based. Carbon blacks are entirely produced from heavy fossil oil fractions. The most common production method is the so called furnace black process in which the oil is dispersed to fine droplets and sprayed into a furnace where it is pyrolyzed at temperatures of about 1000° C. Activated carbons are produced mainly from solid fossil non-powdery raw materials such as lignite or hard coal. Lignocellulosic raw materials such as peat, wood and coconut shells are also used to some extent. Production of activated carbon consists of two steps: Carbonization at temperatures up to 1000° C. for removal of non-carbon elements and a second activation step in order to generate a high surface area.

Annually, about 105 Gigatons of lignocellulosic biomass is being produced corresponding to about 42 Gigatons of carbon. Lignocellulosic biomass could become an abundant raw material for carbon powder products. Carbonization of substrates is more efficient if the substrate is present as fine particles with a large surface area to the hot atmosphere. Carbon Black is produced by pyrolysis of fine fossil-based oil droplets. The main disadvantage with present techniques, which is being addressed in this invention, is that no method exists today for efficient carbonization of lignocellulosic raw material as a powder.

In the article "A Study on Synthesis and Characterization of Biobased Carbon Nanoparticles from Lignin", Prasad Gonugunta et al, *World Journal of Nano Science and Engineering*, 2012, 2, 148-153 there is a disclosed a method for making carbon nanoparticles from lignin. Also in US20120269715 there is disclosed a method for making carbon particles from lignin.

There is however no process available for making carbonized particles or agglomerates by using a lignocellulosic material as a powder whereby this can be performed at a quick pace.

Thus there is a need for method for making carbonized lignocellulosic material as particles or agglomerates which is efficient.

SUMMARY OF INVENTION

The present invention solves one or more of the above problems by providing according to a first aspect a method for manufacturing carbonized particles or agglomerates, wherein said method is continuous or semi-continuous, and wherein said carbonized particles or agglomerates preferably are in the form of a carbon powder, most preferred also electrically conductive, comprising the following steps:

a) providing a dried raw material in powder form emanating from a ligno-cellulosic material, preferably lignin, and suspending and/or diluting said raw material in a fluidic medium, b) carbonization of the raw material in said fluidic medium, at a temperature range of from about 600 to about 2500° C., preferably from about 900 to about 1800° C., most preferred from about 1000 to about 1400° C. thus providing one or more carbonized particles or agglomerates, preferably in the form of a carbon powder, optionally also involving c) a post-treatment.

The present invention also provides according to a second aspect carbonized particles or agglomerates, preferably carbonized carbon powder, obtainable by the method according to the first aspect.

The present invention also provides according to a third aspect use of said product, i.e. carbonized particles or agglomerates, preferably carbonized carbon powder, of the second aspect as controlled release material, in anti-sagging material, as activated charcoal, in water treatment, in solvent recovery, in gaseous states, in air purification, as reinforcement, such as reinforcement in rubber for use in tires, as toner, as rheology enhancer, as pigment, such as in an inkjet composition, as colour filter, as UV-stabilizer, as conductive material, as battery electrode material, as additive in electrically conductive polymer compositions for use in applications such as housings for computers and mobile phones, automotive appliances, wires, cables, pipes and aeronautical appliances, as electrostatic prevention agent, as a filler in polymer compositions (which may comprise polyolefins), in supercapacitors, in sensors, in conductive inks, and as viscous fluid. Said carbonized particles or agglomerates, preferably carbonized carbon powder, of the second aspect may serve as a substitute for carbon black where said carbon black is a normal choice. It may thus serve as a substitute for carbon black which then e.g. may be in rubber reinforcement (such as in tires). It may also serve as a substitute for conductive carbon black for rendering polymers and polymer compositions electrically dissipative/conductive.

Thus in one aspect the present invention provides a continuous or a semi-continuous (quasi-continuous) process which allows an essentially complete carbonization of gas-suspended particulate biomass to take place in a dramatically reduced time span than any other prior art describes. With continuous process it is intended to mean a process uninterrupted in time i.e. it progresses without cessation. The semi-continuous process may be interrupted by e.g. harvesting of the product as set out below.

In yet another aspect the present invention provides a method for carbonization of powdery biomasses in a continuous flow.

In another aspect the presented invention provides a resulting product emanating from applying the present method according to the first aspect on a kraft lignin from softwood. The product resulting from the provided method according to the first aspect of the invention consists of 80 wt % or more elemental carbon in a particulate geometry.

DETAILED DESCRIPTION OF THE INVENTION

It is intended throughout the present description that the expression "lignin" embraces any lignin which may be used for making a carbonized particles or agglomerates, preferably carbonized carbon powder. Examples on said lignin are, but are not limited to softwood lignin, hardwood lignin, lignin from one-year plants or lignins obtained through different pulping methods such as, organosolv pulping or kraft pulping. The lignin may e.g. be isolated by using the process disclosed in EP 1794363. The term "lignin" also encompasses native lignin in biomass and lignin derivatives.

Examples for raw materials include, but are not limited to, wood fibers, pulp fibers, fiber rejects from pulping processes, saw dust, lignocellulosic residues from agricultural crops (such as bagasse, sugar beet, corn stoves), one year plants and of course lignin as such.

The raw material, i.e. feedstock, is a dried lignocellulosic material in powdery state preferably with particle sizes ranging below 1 mm, preferably below 0.1 mm, more preferred below 10 μm. The size distribution may be dependent on feedstock type and pre-treatment.

According to a further preferred embodiment of the first aspect of the invention the carbonization of step b) comprises conveying the raw material in the fluidic medium, preferably in an inert gas mix, into a hot chamber, preferably a furnace system, and continuously thermally treating said raw material in the fluidic medium, preferably during a time period of from about one millisecond up to about a quarter of an hour, thereby providing carbonized particles or agglomerates, preferably in the form of a carbon powder. The furnace may be arranged in such a way that it allows the raw material in the fluidic medium to move vertically (both upwards or downwards) or horizontally (from right to left or the other way around). During the thermal treatment there may be one or more temperature steps and thus a number of zones.

According to a further preferred embodiment of the first aspect of the invention the inert gas mix consists of nitrogen and carbon-dioxide. The ratio may be 50/50. Other inert gases which do not react at temperatures below 100° C. are also possible to use in this context. There may also be a third gas for conveying the dilute gas-solid-phase-mixture into the processing chamber. This may be any gas as set out above or other gas which is either inert or takes part in the reaction. The feeding of the gas-solid-phase-mixture into the processing chamber may be in a laminar stream or a turbulent stream. Particle loading of gas may be varied. The mixing of the particles with gas initially may be done at a cold state below 200° C. (preferably below 100° C.). The collection of product in hot gas stream may call for cooling. Thus in connection with the harvesting (the separation) of the product after the thermal treatment in step b), cooling gas or a gas mixture may be used.

According to a further preferred embodiment of the first aspect of the invention the raw material of step a) is above 90% dry solids.

According to a further preferred embodiment of the first aspect of the invention the raw material in step a) has been pre-treated, such as homogenized, milled, crushed and/or impregnated with a fluidic medium.

According to a further preferred embodiment of the first aspect of the invention the raw material of step a) has been milled to a defined particle size, optionally involving also treatment with aiding agents, such as impregnation with a liquid, such as a solvent, salt, water, or a mixture thereof. The pre-treatment of the raw material, i.e. the feedstock, may as said involve: grinding, milling, mixing and/or homogenizing, and in addition it may also involve adding water, acid, caustic agent, ionic liquids and/or salts According to a further preferred embodiment of the first aspect of the invention the resulting carbonized particles or agglomerates from step b) are separated, wherein said separation may involve extraction and/or collection, from the fluidic medium before the optional post-treatment.

According to a further preferred embodiment of the first aspect of the invention the post-treatment of step c) includes milling, impregnating and/or coating of said carbonized particles or agglomerates, preferably in the form of a carbon powder, to defined particle size, surface properties, surface polarization and/or affinity for certain substances.

According to a further preferred embodiment of the first aspect of the invention the carbonized particles or agglomerates, preferably carbonized carbon powder, have a BET surface area of above 100 $m^2/g$, preferably from about 130 to about 1000 $m^2/g$.

According to a further preferred embodiment of the first aspect of the invention the carbonized particles or carbonized agglomerates in said carbonized carbon powder exhibit dimensions from about 1 nm to about 1 mm, preferably from about 10 nm to about 500 μm, most preferred from about 10 nm to about 250 μm. Said carbonized particles or carbonized agglomerates in said carbonized carbon powder may also exhibit dimensions with an average particle size ranging between 0.01 μm to 1 mm, such as between 0.01 μm to 100 μm.

The obtained product i.e. the carbonized powder may have a carbon content of at least 85%.

The obtained product i.e. the carbonized powder may also have a carbon content of at least 85% and an average particle size ranging between 0.01 μm to 1 mm, preferably between 0.01 μm to 100 μm.

The carbonized particles or agglomerates may, as said, consist of primary particles that are preferably agglomerated and forming a powder.

The carbonization process according to the first aspect may also be described as follows and may comprise the following steps:

Step 1 (Optional): Drying raw material to >90% dry solids

Step 2 (Optional): Milling raw material to a powder of defined particle size; treatment with aiding agents such as impregnation with a solvent, water or other fluid Step 3: Powderous carbonization in inert atmosphere at 600-2500° C., such as at 700-1500° C. (as described in detail)

Step 4 (Optional) Post-treatment such as milling, impregnating, coating of raw carbon powder to defined particle size, surface properties, surface polarization, affinity for certain substances, Description of Step 3 (Carbonization Step):

The described method of thermally carbonizing a powderous raw material consists of three process sub-steps. The first sub-step 3.1 is feeding the powderous raw material, wherein the powder is being fed into the furnace system and suspended in a fluidic medium, preferably an inert gas. Any conventional feeding technique known in thermal spray technology can be employed, i.e. gravity-based devices, rotating wheel devices or fluidized-bed systems (Handbook of Thermal Spray Technologies, ed. Joseph R. Davis, 2004, ASM International, pp. 137-141). During this step the volume or mass throughput is controlled. The second sub-step 3.2 is the actual thermal carbonization, wherein the powder/gas mixture is being conveyed into a hot chamber. The process is preferably running continuously or semi-continuously, so that the inlet stream is continuously or semi-continuously fed into the chamber at the inlet and subsequently after the carbonization exited at another end. The material carbonizes when it, as a powder, is exposed to temperatures ranging from 600° C. to 2500° C., such as between 900° C. and 1800° C. or between 1000° C. and 1400° C., for a duration between one millisecond up to several minutes. One critical technical aspect is the control of particle suspension during the conveying through the chamber. In a preferred modus the particles have little or no contact time to the outer chamber walls, so that there is not collection of any type of charred, remaining residue inside the chamber. This suspension may be achieved through an adequate gas-particle-flow design for example a controlled vortex flow.

The third step is the separation, which may involve extraction and collection, of the carbonized matter as well as off-gases and other residues from the chamber. The separation step may be batch-wise such as when emptying a filter that has collected the carbonized powder. After passing through the heat treatment the thus treated material is continuously conveyed in to an adequate piping where a cooling to lower temperatures is happening. In one aspect this cooling may be realized by injection of cooler gas streams, which depending on prevailing temperature levels possibly need to be inert in nature. These lower temperature levels depend on the employed cooling measures. The solid-gas-phase mix with the suspended carbonized particles needs normally to be separated. This separation will allow a collection of the solid particulate shaped product from the gas phase. Separation may be achieved with in a number of ways known in the prior art, of which filtration is one obvious choice. Other measures of separation which are known in the state of art for particle or powder classification may be used alternatively. In another suggested form, the cooling could be attained by using quench water. This method is well known in the prior art for carbon black making. The employed methods are also an obviously possible concept.

The method according to the first aspect of the invention may be realized in a number of ways. The process chamber or furnace chamber may be realized in various different forms. In general this chamber should have an inlet and an outlet. It may be realized as a circular tube. The cross section of this tube can be circular in shape or otherwise non-circular such as elliptical or rectangular or multigonal (such as hexagonal) or a mix of these cross sectional shapes. In general the tube cross section may be constant of the length. But it may also be possible to have a changing cross section, be that in shape or in dimensions or both.

The configuration of this furnace chamber is depicted in FIG. 2, FIG. 3 and in FIG. 4, respectively and obviously this may be varied depending on the installation needs, the process requirements or the process behaviour of the feedstock or the feedstock-gas-mixture. The major difference between the three presented configurations is the orientation of the furnace tube or furnace chamber and its relative orientation between inlet and outlet. In FIG. 2 the inlet and outlet are designed to be on a similar height level, essentially resulting in a horizontal processing hot zone in between. This configuration may be varied to the extreme positions either in FIG. 3 or in FIG. 4. In FIG. 3 the inlet is positioned at the upper end of the furnace chamber or furnace tube and the outlet at the lower end. Thus the process is in a vertical configuration and the product flow is from top to bottom. In another configuration the inlet is placed at the bottom and the gas-feedstock-mix is conveyed upwards through the chamber and exits at the upper end, basically also resulting in a vertical process, as depicted in FIG. 4. Depending on the process and product needs the configuration could be varied in any position in between the ones illustrated in FIGS. 2, 3 and 4, respectively.

Depending on the process needs, the furnace chamber or furnace tube may consist of multiple, independently controlled temperature zones. In the configurations mentioned above, three zones may be imaginable, but more or less are also technically possible. The temperature levels of these zones may be chosen between e.g. 600° C. and 2500° C. Lower temperatures are also possible to realize, but a carbonization is not to be expected. Also higher temperature levels are technically feasible, but are increasingly difficult to attain, maintain and also might have a negative effect on efficiency aspects.

The method according to the first aspect of the present invention may as said be used for treating different feedstock materials as listed above, and then the process may be varied depending on these choices of raw material, with e.g. selected process and cooling gases. Here the reactivity on the various temperature levels may be considered. In the presented technique the inert gas nitrogen is one obvious choice when cooling.

Depending on the feedstock and the targeted product properties, also the choice of carbon dioxide in the partial mixture of the gas components may be contemplated. In the method according to the first aspect, the carbon dioxide is present in the carbonization reaction in the hot furnace chamber. Other inert gases may also be possible for the utilization as process gas, diluting gas or as cooling gas. The use of nitrogen is though preferred.

Preferred features of each aspect of the invention are as for each of the other aspects mutatis mutandis. The invention is further described in the appended figures, which do not limit the scope of the invention in any way. The embodiments of the present invention of the enclosed figures is described in more detail using the appended figures, the only purpose of which is to illustrate the invention and is in no way intended to limit its extent. The prior art document mentioned herein is incorporated to the fullest extent permitted by law.

EXAMPLE

Figure 1:
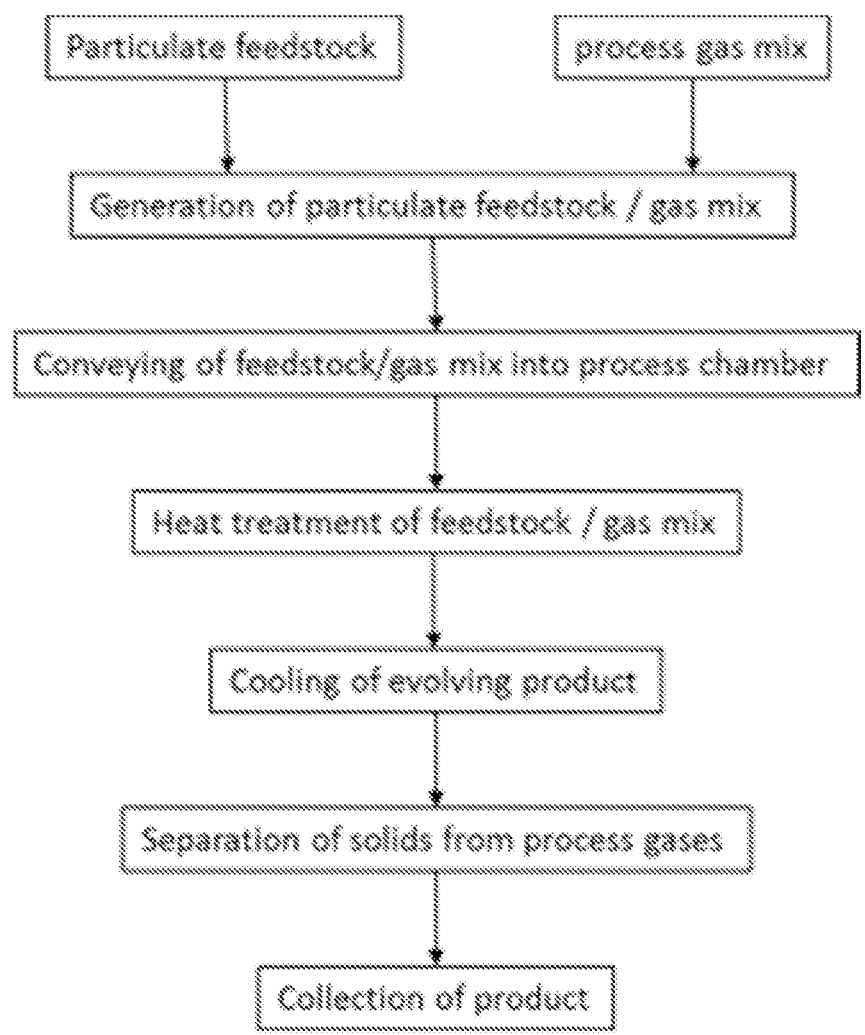
FIG. 1 depicts the process flow of the present invention.
Figure 2:
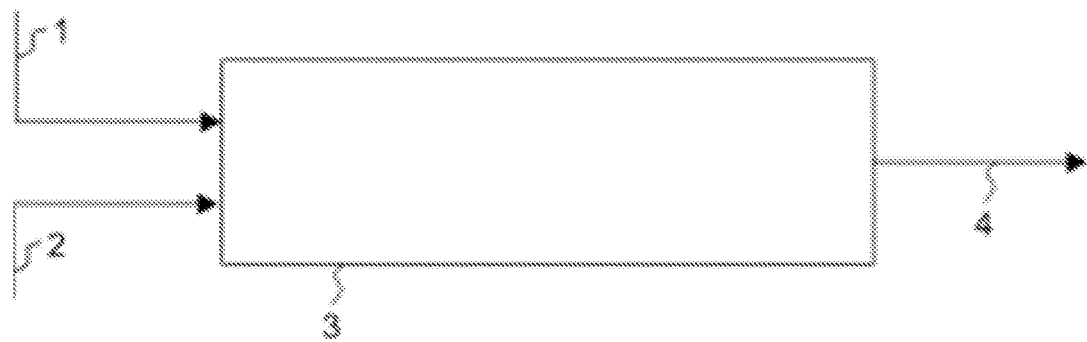
FIG. 2 illustrates a schematic overview of the present method in a first embodiment
Figure 3:
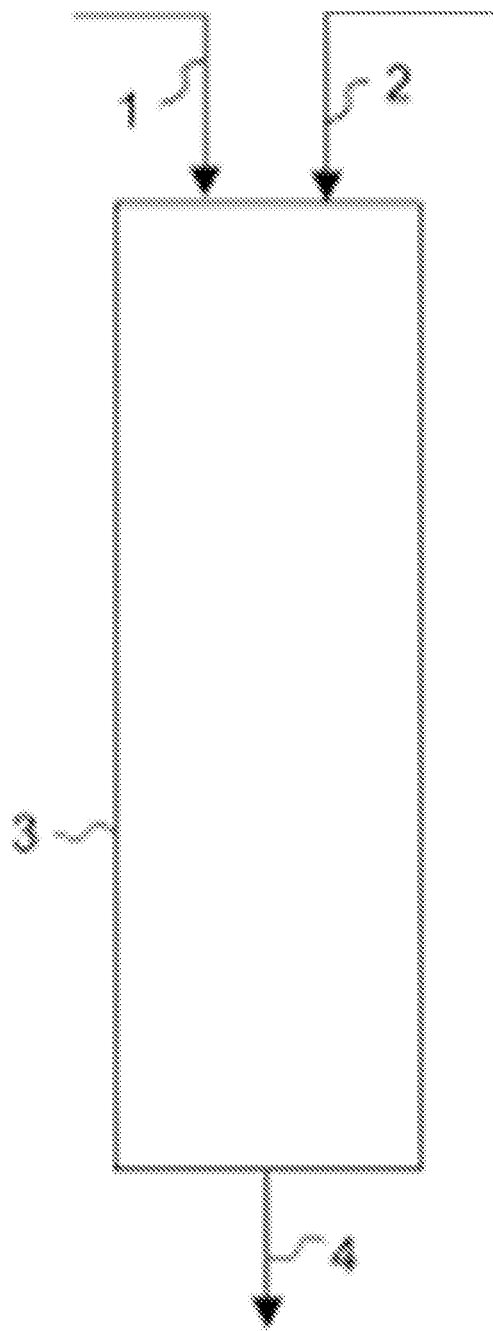
FIG. 3 illustrates a schematic overview of the present method in a second embodiment
Figure 4:
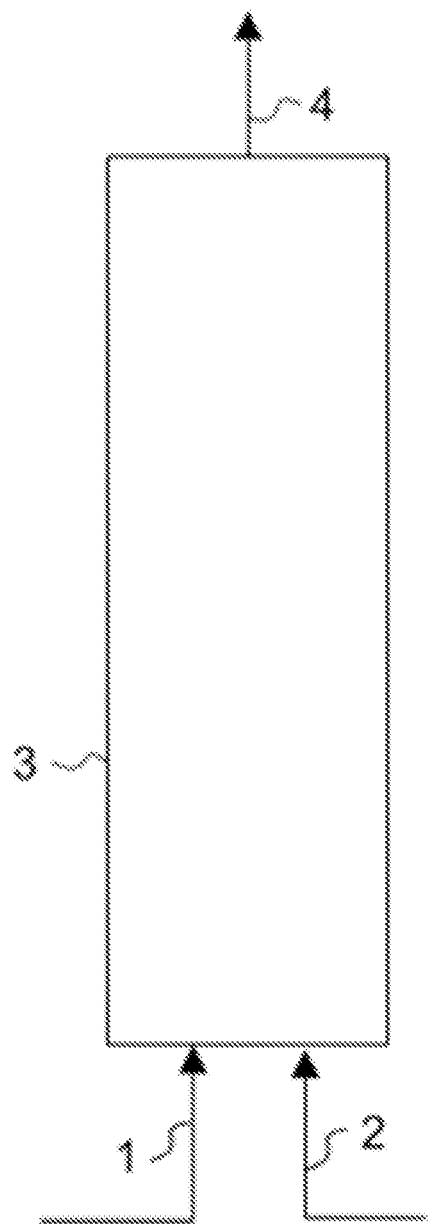
FIG. 4 illustrates a schematic overview of the present method in a third embodiment

The present invention according to the first aspect was realized in a form as depicted in FIG. 4. The process direction in this case was from bottom to top upwards. The biomass (1) used as solid feedstock was a kraft lignin from softwood. The approximately 95 wt % dry content lignin was mixed into a dilute phase state with nitrogen and fed continuously by injection of a second gas into the stream and directly onward into the heat treatment chamber (3)—in this case a circular shaped tube. The injection gas employed was a carbon dioxide. Thus a gas mixture (2) of 50 vol % nitrogen and 50 vol % carbon dioxide was mixed with the lignin continuously. This mixture was conveyed into the hot furnace tube and the resulting solid as well as gaseous products (4) were exiting the tube at the top end.

The process temperature was set to 1400° C. in the middle level of the tube. The solid feeding was dosed in steps between 5 g/min to 15 g/min. The time span in the hot zone was an estimated average of maximum 3 seconds.

The exiting material stream (4) consisting of a gas-solid-mix, was cooled by an injected inert gas flow which was at room temperature (ca. 20° C.). The cooled gas-solid-mix was pumped through a ceramic filter cloth, on which surface the solid, particulate product was collected.

FIG. 5a to FIG. 8 show SEM as well as TEM analysis of the results. It is clearly visible that the products, which emanated from kraft lignin from softwood treated with the presented carbonization method, are mainly spherical carbon particles. The yielding materials are carbon spheres in the range of a few nm in diameter up to approximately 100 µm. Agglomerated state of tiny particles is also evident.

Figure 5A:
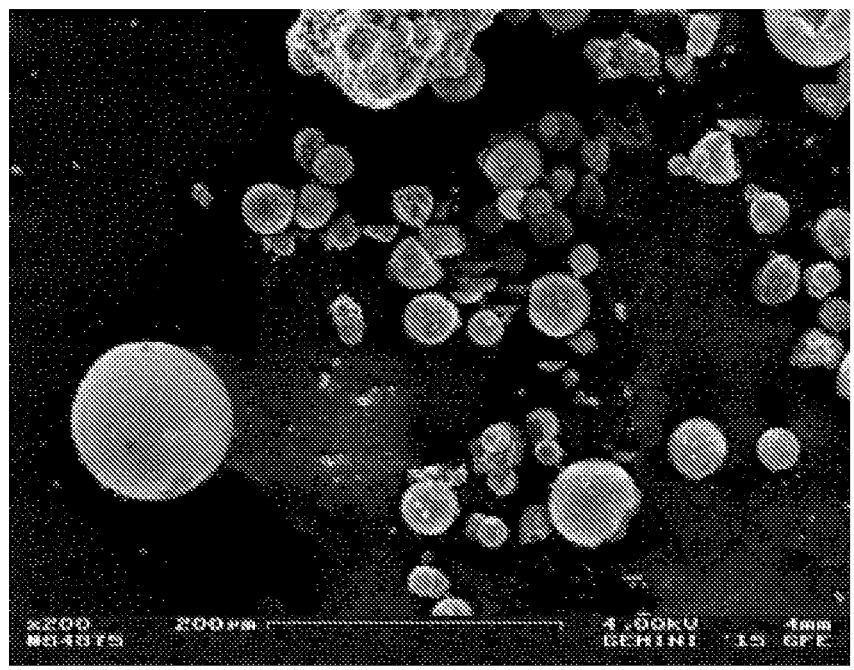
FIG. 5a shows a SEM scan of the obtained product
Figure 5B:
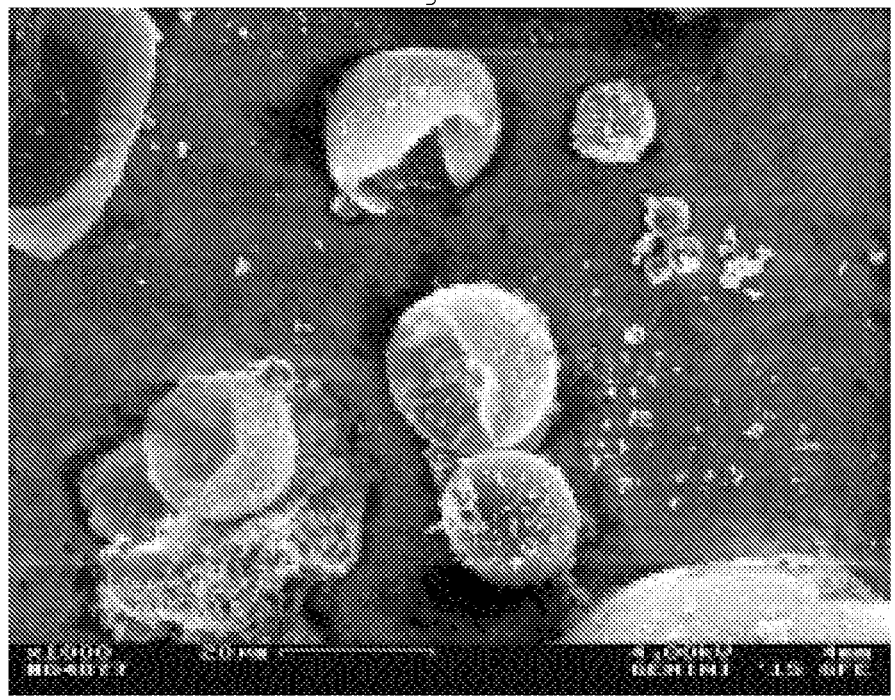
FIG. 5b shows a SEM scan of the obtained product
Figure 6A:
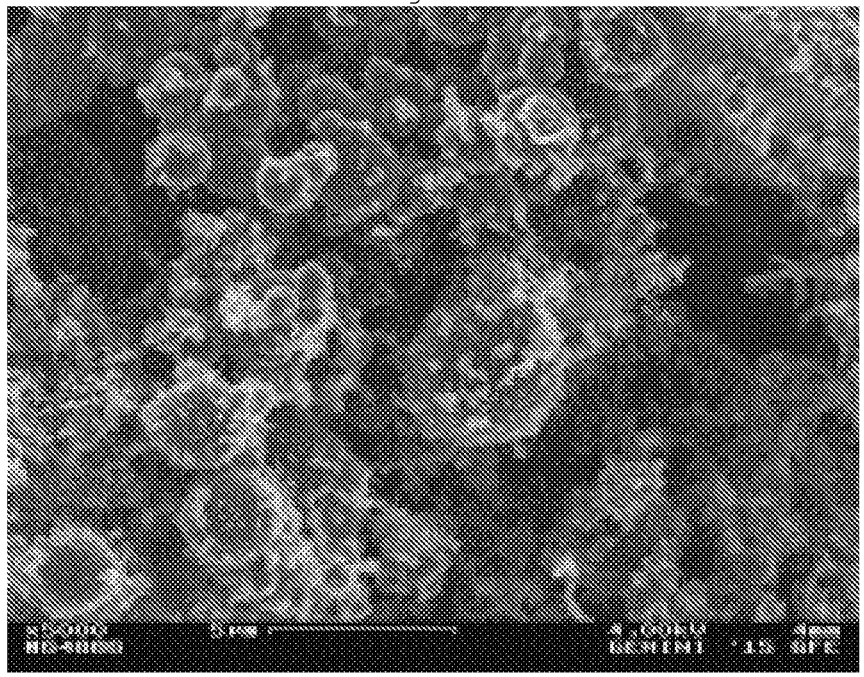
FIG. 6a shows a SEM scan of the obtained product
Figure 6B:
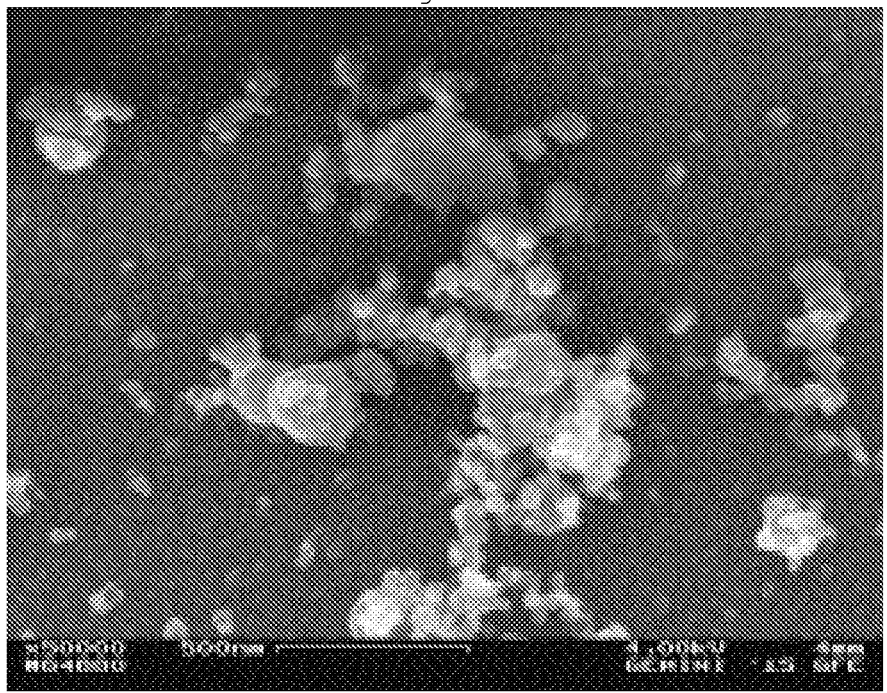
FIG. 6b shows a SEM scan of the obtained product

FIG. 5b shows examples of the resulting spherical particles in a collapsed as well as open structure form. Clearly visible is thus the hollow nature of these larger spheres.

Figure 7A:
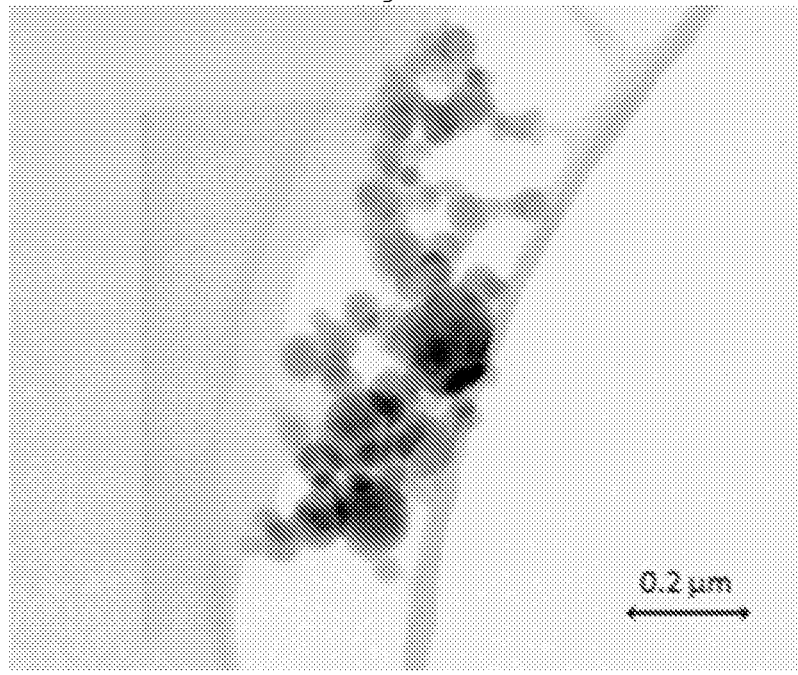
FIG. 7a shows a TEM analysis of the obtained product
Figure 7B:
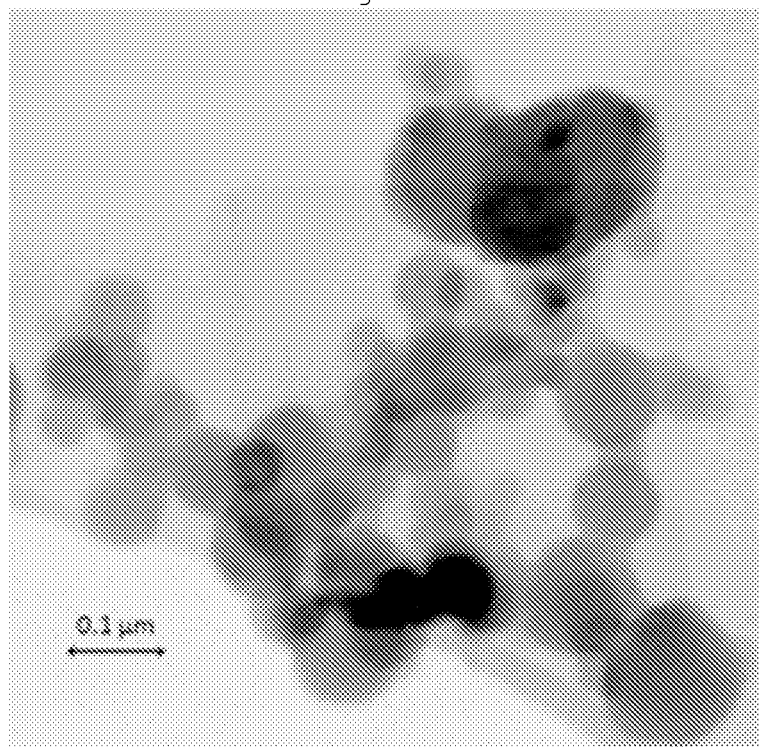
FIG. 7b shows a TEM analysis of the obtained product

FIG. 7a and FIG. 7b show scanning transmission electron microscopy analysis of the lower diameter fraction of the product. Here the dimensions on the lower diameter range of several nm to dozens of nm are clearly visible. Also the tendency of the individual spheres or particles to form agglomerates is evident.

Figure 8:
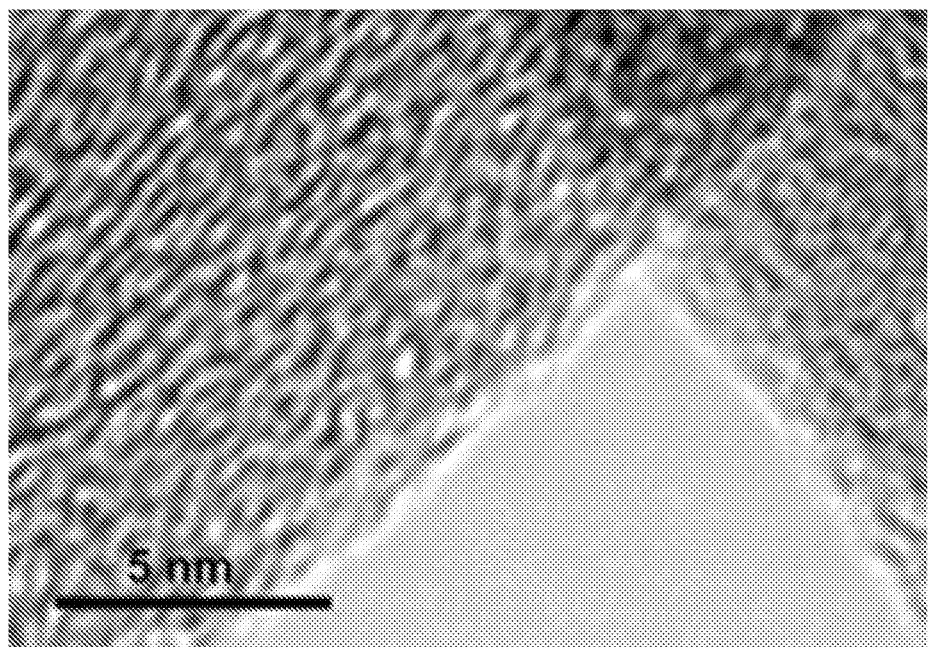
FIG. 8 shows a TEM analysis of the obtained product
Figure 9:
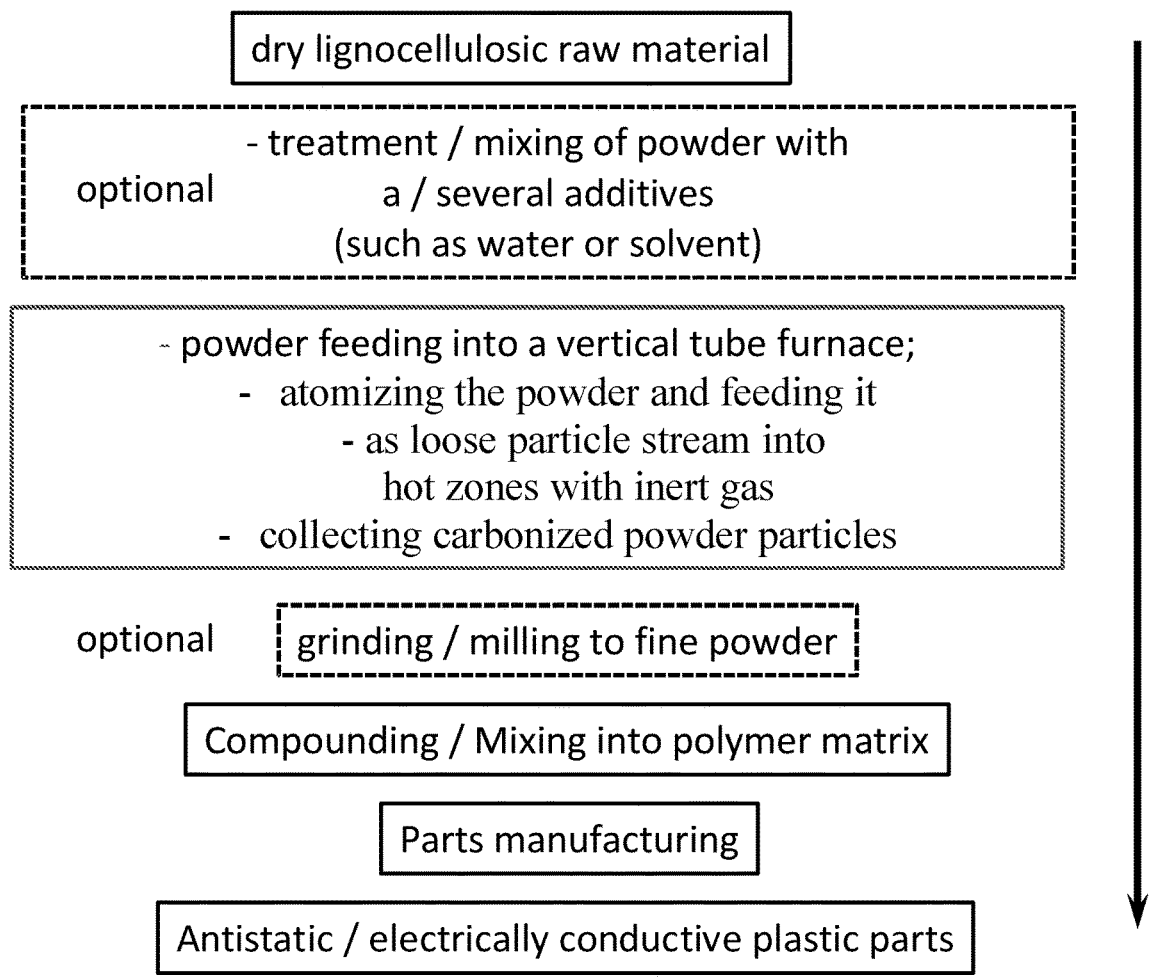
FIG. 9 illustrates a schematic overview of the presented method whereby also the product thereof is further used in plastic parts.

FIG. 8 shows a high resolution transmission electron microscopy analysis of such a smaller particle. It is clearly visible that there is some regular spacing between the molecular structures which have little or no apparent preferred orientation. The analysis of the yielded product also suggests that there are domains with aromatic stacking inside the crystalline structure. The spacing of these crystalline structures is in the range of so called graphitic stacking or layering.

The BET Surface area for the product obtainable from the method according to the first aspect was 138.18 m$^2$/g.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods may be combined with other known methods. Other aspects, advantages and modifications within the scope of the invention will be apparent to those skilled in the art to which the invention pertains.

The invention claimed is:

1. A method for manufacturing carbonized particles or agglomerates, comprising the following steps:
   a) providing a dried raw material in powder form emanating from a ligno-cellulosic material,
   b) suspending said raw material in an inert gas medium to form a powder-gas suspension,
   c) continuously conveying the powder-gas suspension into, through and out of a hot chamber and continuously treating said raw material in the powder-gas suspension during a time period from about one millisecond up to about a quarter of an hour at a temperature range of from about 900 to about 1800° C., thus providing one or more carbonized particles or agglomerates,
   d) cooling the carbonized particles or agglomerates, and
   e) separating carbonized particles or agglomerates from off-gases or other residues.

2. The method according to claim 1 wherein the inert gas medium comprises a mixture of nitrogen and carbon-dioxide.

3. The method according to claim 1 wherein the raw material of step a) is above 90% dry solids.

4. A method according to claim 1 wherein the raw material in step a) has been pre-treated.

5. The method according to claim 1 wherein the raw material of step a) has been milled to a defined particle size, involving also treatment with aiding agents, wherein the adding agents are impregnation with a liquid, solvent, salt, water, or a mixture thereof.

6. The method according to claim 1, further comprising,
   f) a post treatment step.

7. The method according to claim 6 wherein the post-treatment of step f) includes milling, impregnating and/or coating of said carbonized particles or agglomerates to defined particle size, surface properties, surface polarization and/or affinity for certain substances.

8. A method according to claim 1 yielding carbonized particles or agglomerates having a BET surface area of above 100 m$^2$/g.

9. A method according to claim 8 wherein the carbonized particles or carbonized agglomerates therein exhibit dimensions from about 1 nm to about 1 mm.

10. The method according to claim 1, wherein said carbonized particles or agglomerates are in the form of a carbon powder.

11. The method according to claim 1, wherein said carbonized particles or agglomerates are in the form of an electrically conductive carbon powder.

12. The method according to claim 1, wherein the ligno-cellulosic material of step a) is lignin.

13. The method according to claim 1, wherein the carbonization of the raw material in step c) is at a temperature range from about 1000 to about 1400° C.

14. A method according to claim 6 wherein the separation step e) involves extraction and/or collection, from the inert gas medium before step f) post-treatment.

15. The method according to claim 1, wherein the hot chamber is a furnace system.

16. The method according to claim 7, wherein the carbonized particles or agglomerates are in the form of a carbon powder.

17. A method according to claim 1 yielding carbonized particles or agglomerates having a BET surface area from about 130 to about 1000 $m^2/g$.

18. A method according to claim 8 wherein the carbonized particles or carbonized agglomerates therein exhibit dimensions from about 10 nm to about 500 μm.

19. A method according to claim 8 wherein the carbonized particles or carbonized agglomerates therein exhibit dimensions from about 10 nm to about 250 μm.

20. A method according to claim 4 wherein, in the raw material pretreatment in step a), the raw material is homogenized, milled, crushed and/or impregnated with a fluidic medium.

21. A method according to claim 1 wherein the raw material powder-gas suspension is conveyed through the hot chamber in a controlled vortex flow.

22. A method according to claim 1 further comprising controlling the powder-gas suspension during the step of conveying through the hot chamber so that the powder has little or no contact time with walls of the hot chamber.

23. The method according to claim 1 wherein the inert gas medium is nitrogen.

24. A method for manufacturing carbonized particles or agglomerates, comprising the following steps:
   a) providing a dried raw material in powder form emanating from a ligno-cellulosic material,
   b) suspending said raw material in an inert gas medium to form a powder-gas suspension, wherein the raw material powder is suspended in the inert gas medium by thermal spraying,
   c) continuously conveying the powder-gas suspension into and through a hot chamber and continuously treating said raw material in the powder-gas suspension during a time period from about one millisecond up to about a quarter of an hour at a temperature range of from about 900 to about 1800° C., thus providing one or more carbonized particles or agglomerates,
   d) cooling the carbonized particles or agglomerates, and
   e) separating carbonized particles or agglomerates from off-gases or other residues.

* * * * *